United States Patent [19]

Hatano et al.

[11] Patent Number: 4,548,580
[45] Date of Patent: Oct. 22, 1985

[54] CALCINING APPARATUS FOR POWDERY MATERIALS

[75] Inventors: Hirofumi Hatano; Masayasu Yamazaki, both of Kitakyushu; Atsushi Sasaki, Hiroshima; Keigo Mikami, Hiroshima; Kiyomichi Taoda, Hiroshima; Mitsuharu Murakami, Hiroshima, all of Japan

[73] Assignees: Mitsubishi Jukogyo K.K.; Mitsubishi Mining and Cement Co., Ltd., both of Tokyo, Japan

[21] Appl. No.: 445,439

[22] Filed: Nov. 30, 1982

[30] Foreign Application Priority Data

Dec. 4, 1981 [JP] Japan ................. 56-196104
Dec. 4, 1981 [JP] Japan ................. 56-196105
Dec. 4, 1981 [JP] Japan ................. 56-196106
Dec. 4, 1981 [JP] Japan ................. 56-196107

[51] Int. Cl.$^4$ ............... F27B 7/02; F27B 15/00; C04B 7/02
[52] U.S. Cl. .................... 432/106; 106/100; 432/14
[58] Field of Search ............ 432/14, 106; 106/100

[56] References Cited

U.S. PATENT DOCUMENTS 4,402,667 9/1983 Goldmann ............... 432/106

Primary Examiner—John J. Camby
Attorney, Agent, or Firm—Wyatt, Gerber, Shoup, Scobey & Badie

[57] ABSTRACT

There is here disclosed a calcining apparatus for a powdery material comprising a first preheating series composed of a calcining kiln and preheaters at a plurality of stages for heating the powdery material with an exhaust gas from the calcining kiln, a second preheating series composed of other preheaters at a plurality of stages for heating the powdery material with an exhaust gas from a rotary kiln, and a gas carrying pipe for connecting the first and second preheating series in the middle thereof, a flow path for the powdery material being adapted so that the powdery material fed to each series may be led into the rotary kiln via a combining duct disposed in front of the undermost preheaters in both the series and then via the undermost portions of both the series. Further, disclosed is a calcining apparatus for a powdery material in which a sub-calcining kiln and a calcining chamber are disposed on an exhaust gas pipe extending from a rotary kiln. Still further, disclosed is a calcining apparatus for a powdery material in which a calcining chamber is disposed, and a flow path through which the powdery material fed to first and second preheating series passes is provided with a powdery material carrying pipe for connecting both the series in front of the second preheaters from the bottom in both the series, and is further provided with a combining duct for combining powdery materials from both the series in the rear of the second preheaters from the bottoms in both the series.

7 Claims, 8 Drawing Figures

CALCINING APPARATUS FOR POWDERY MATERIALS

This invention relates to a calcining apparatus composed of a multi-stage suspension preheater and a calcining kiln for calcining a powdery substance at a preliminary stage prior to its treatment in a rotary kiln.

Examples of powdery materials to be calcined by the calcining apparatus according to this invention include cement materials, limestone, dolomite, magnesite and magnesium hydroxide, but the cement materials are most common.

The prevalent multi-stage suspension preheater is usually constituted by stacking a plurality of combinations each of which comprises a solid-gas separator and a riser, and the prevalent calcining kiln has a fuel feeding device and a fluidized bed.

As the calcining apparatus comprising a combination of the multi-stage suspension preheater and the calcining kiln, there are known an incorporated calcining kiln system, a separate calcining kiln gas combining system and a separate calcining kiln gas parallel flow system.

The calcining apparatus of the incorporated calcining kiln system has a calcining kiln, equipped with a fuel feeding device, which is incorporated in series between a rotary kiln and a multi-stage suspension preheater, whereby an exhaust gas from the rotary kiln is all caused to pass through the calcining kiln. Air necessary for combustion in the calcining kiln is generally introduced directly to the calcining kiln along a certain channel without calling at the rotary kiln, and is mixed with the exhaust gas from the rotary kiln in the calcining kiln.

The separate calcining kiln gas combining system has a calcining kiln, equipped with a fuel feeding device, which is disposed in parallel with and separately from a rotary kiln, whereby an exhaust gas from the calcining kiln and an exhaust gas from the rotary kiln are combined and then fed to the multi-stage suspension preheater. The separate calcining kiln gas parallel flow system above has a calcining kiln and a rotary kiln which are disposed in parallel with each other, and in this system, exhaust gases from these kilns are not be combined.

In the case of the calcining apparatus of the incorporated calcining kiln system, the drive operation, particularly the operation of a non-steady state such as starting or stopping is advantageously simple and easy, but the consumption of a used fuel is appreciably great. In other words, according to the incorporated calcining kiln system, air and the exhaust gas from the rotary kiln are mixed, therefore the partial pressure of oxygen for the combustion is low, so that the combustion of the fuel is not smooth, and since the exhaust gas from the rotary kiln, the combustion gas from the calcining kiln and a gas generated by the calcination are all treated, the whole volume of the gases is too much. Thus, in order to obtain such a residence time as allows the calcination to proceed sufficiently, the calcining kiln must be designed in a noticeably large form. For example, the amount of the gas in the incorporated calcining kiln system is about twice as much as that of the gas to be treated in the calcining kiln of the separate calcining kiln system, accordingly the former system requires twice or more as large the calcining kiln as the latter. Thus, a large space is to be occupied between the rotary kiln and the preheater, and it is inevitable that the preheater and a frame work for supporting the same must be constructed noticeably high.

In the case that coal, the combustion rate of which is slower than petroleum is employed as the fuel for the calcining kiln, the incorporated calcining kiln system is more disadvantageous in point of the fuel consumption. In order to overcome this drawback, it is necessary to reduce greatly the grain size of the coal extremely, but a great deal of power will be required to grind the coal.

In contrast, according to the separate calcining kiln system, the partial pressure of oxygen in the combustion atmosphere of the calcining kiln is high, and the fuel is caused to burn promptly with the small amount of air on the upstream side of the calcining kiln in order to elevate a gas temperature, so that the temperature difference between the gas and the powdery material will be great, and the calcination can be thus noticeably accelerated. Further, the separate calcining kiln system is bitter than the incorporated calcining kiln system in that the former system may require a long residence time because of the calcination treatment being carried out at two stages, and the sensible heat of the exahust gas from the rotary kiln can be utilized effectively in the calcination of the powdery material.

The separate calcining kiln gas parallel flow system mentioned above includes two procedures which are different in channels for the powdery material. According to one of the two procedures, the powdery material collected by a second solid-gas separator from the bottom of a multi-stage suspension preheater is fed to a gas duct disposed between the rotary kiln and the preheater, is then separated by the undermost solid-gas separator in the series on the rotary kiln side, is further fed to a separate calcining kiln, and is finally fed to the rotary kiln via the lowest solid gas separator in the series on the calcining kiln side. According to another of the two procedures, the powdery material collected by a second solid-gas separator from the bottom of a multi-stage suspension preheater is fed to the rotary kiln inversely via the separate calcining kiln and then a calcining area between the rotary kiln and the preheater. Both of these procedures are about the same in the consumption of the fuel.

As is clear from the above, among the conventional calcining apparatuses in which the multi-stage suspension preheater and the calcining kiln are combined, the separate calcining system is excellent in point of calcining function.

Even the separate calcining system, however, is not sufficient in respects of the calcination level and the thermal efficiency of the powdery material. For example, in the case of the gas parallel flow system just described, there are inbalances of gas flow rate and heat between gas parallel flow paths. Additionally, even if it is intended to adjust the flow rate of the powdery materials passing through the gas flow paths, it is difficult to make adjustment so that the sensible heat carried by the exhaust gas from the preheater may be minimized.

An object of this invention is to provide an improved calcining apparatus for a powdery material comprising a combination of a multi-stage suspension preheater and a calcining kiln, by which apparatus the calcination degree of the powdery material can be iproved up to nearly 100%, the saving of a used fuel can be expected, and a crushed coal can be used as the fuel, and which apparatus is excellent in drive performance, is simple and is inexpensive.

This invention has the following characteristics to accomplish the above object: That is to say, a first invention with regard to this application is directed to a calcining apparatus for a powdery material comprising a first preheating series (hereinafter referred to as Series I) composed of a calcining kiln and preheaters at a plurality of stages for heating the powdery material with an exhaust gas from the calcining kiln, a second preheatng series (hereinafter referred to as Series II) composed of other preheaters at a plurality of stages for heating the powdery material with an exhaust gas from a rotary kiln, and a gas carrying pipe for connecting Series I and II in the middle thereof, a flow path for the powdery material being adapted so that the powdery material fed to each series may be led into the rotary kiln via a combining duct disposed in front of the undermost preheaters in both series and then via the lowest portions of both series.

Further, a second invention is directed to a calcining apparatus for a powdery material comprising a first preheater for heating the powdery material with an exhaust gas from a calcining kiln, a second preheater for heating the powdery material with exhaust gases from a rotary kiln and a sub-calcining kiln interposed between the second preheater and the rotary kiln, and a preheater group which comprises a plurality of other preheaters stacked in the rear of the first and second preheaters and heat the powdery material with a mixed gas from the first and second preheaters, a flow path for the powdery material being adapted so that the whole amount of the powdery material discharged from the preheater group may be fed to the rotary kiln via the calcining kiln, the sub-calcining kiln, the first and second preheaters.

Still further, a third invention is directed to a calcining apparatus for a powdery material comprising Series I composed of a calcining kiln and preheaters at a plurality of stages for heating the powdery material with an exhaust gas from the calcining kiln, Series II composed of a sub-calcining kiln disposed on an exhaust gas pipe extending from the rotary kiln and other preheaters at a plurality of stages for heating the powdery material with an exhaust gas from the sub-calcining kiln, and a gas carrying pipe for connecting Series I and II in the middle thereof, a flow path for the powdery material being adapted so that the powdery material fed to each series may be fed into the rotary kiln via a combining duct disposed in front of the lowest preheaters in both the series and then via the lowest portions of both series.

Still further, a fourth invention is directed to a calcining apparatus for a powdery material comprising Series I composed of a calcining kiln and preheaters at a plurality of stages for heating the powdery material with an exhaust gas from the calcining kiln, Series II composed of a calcining chamber disposed on an exhaust gas pipe extending from a rotary kiln and other preheaters at a plurality of stages for heating the powdery material with an exhaust gas from the rotary kiln, a gas carrying pipe for connecting Series I and II in the middle thereof, a flow path for the powdery material being adapted so that the powdery material fed to each series may be led into the rotary kiln via a combining duct disposed in front of the lowest preheaters in both series and then via the lowest traveling portions of both series.

According to this invention, the calcining kiln is separated from the rotary kiln, two preheating series of Series I and Series II are employed, and a gas combining pipe is disposed between Series I and II, whereby balancing the gas quantity, the gas-in-retaining heat quantity and the powdery material quantity between the two series can be accomplished, the residence time of the powdery material can be increased in calcinating sections of two stages, a portion of the powdery material can be caused to recycle through the calcinating sections, a calcination degree of the powdery material can be raised up to nearly 100%, the thermal efficiency can be improved, and optimum conditions can be suitably controlled. Further, according to this invention, there can be additionally combined a flow calcining device for burning a crushed coal as a fuel with good thermal efficiency which the inventors of this invention have suggested separately, whereby an efficient operation can be carried out by the use of the crushed coal as a fuel which is slow in combustion rate, operation is easy, and facilities are economical.

Still further, according to this invention, the calcining apparatus comprises the combination of a multi-stage suspension preheater and a calcining kiln, the latter is composed of a main calcining kiln separated from the rotary kiln and a sub-calcining kiln connected to the exhaust gas pipe extending from the rotary kiln, and the whole powdery material is caused to pass through the main calcining kiln and the sub-calcining kiln, whereby the heat exchange efficiency between the solid and the gas in the calcinating sections is improved, the combustion quantity of the fuel in the three kilns of the rotary kiln, the main calcining kiln and the sub-calcining kiln can be set to optimum conditions, the calcination degree of the powdery material can be increased up to about 100%, and the amount of fuel used can be descreased. Moreover, when there is additionally combined a flow calcining device for calcining a crushed coal as the fuel in a good thermal efficiency which the inventors of this invention have suggested separately, even the crushed coal fuel can be employed efficiently.

Still further, according to this invention, the sub-calcining kiln or the calcining chamber may be disposed on the exhaust gas pipe extending from the rotary kiln, whereby $NO_x$ in the exhaust gas from the rotary kiln can be reduced in addition to the aforementioned effects, a pressure loss caused by a formed coating can be decreased much more than in the case of a conventional calcining apparatus, and the removal of the coating can be carried out with ease.

The above-mentioned and other objects, features and advantages of this invention will become more apparent from the following description given with reference to the accompanying drawings, in which.

Figure 1:
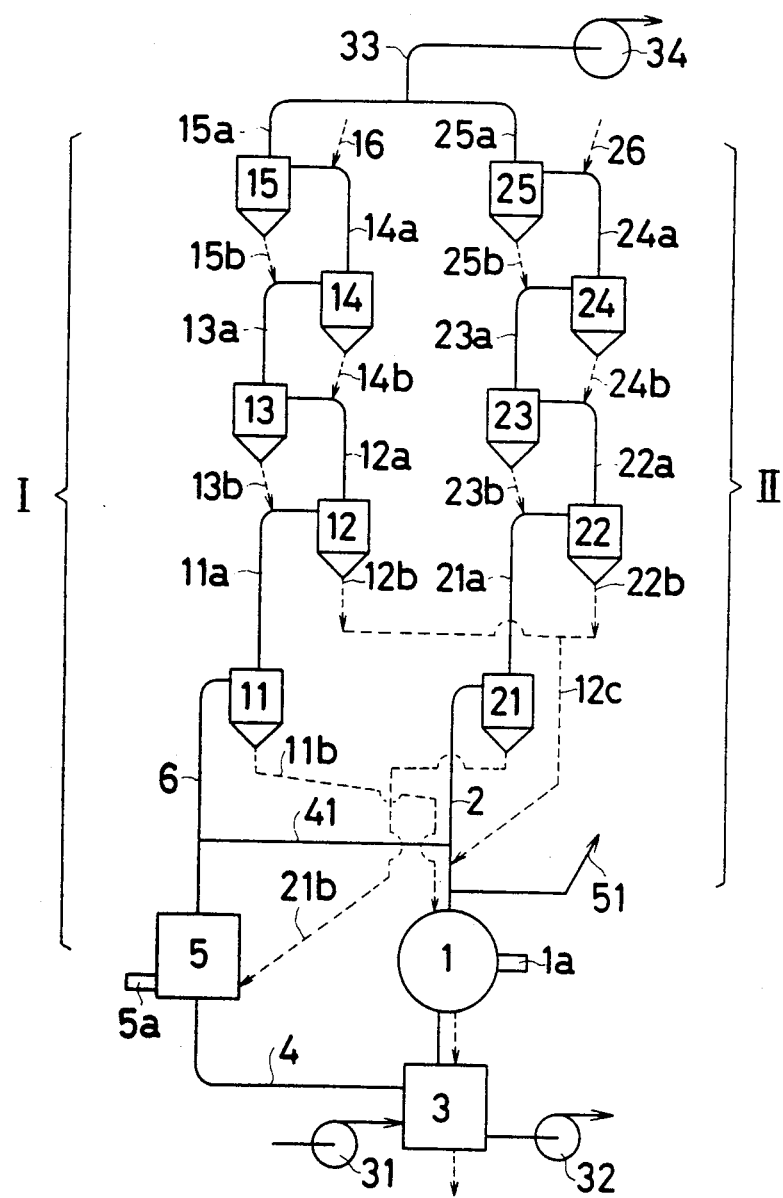
FIGS. 1 and 2 are flow sheets showing embodiments of a first invention of this disclosure.

Referring now to FIG. 1 in which a flow sheet of the first invention with regard to this application is shown, reference numeral 1 is a rotary kiln, numeral 2 is an exhaust gas pipe extending from the rotary kiln, 3 is a cooling device for cooling a calcined material, 4 is a bleeding pipe extending from the cooling device, 5 is a calcining kiln and 6 is an exhaust gas pipe extending from the calcining kiln. In the drawing, the solid lines and the dotted lines represent passages for air and gases and flow paths of a powdery material, respectively.

This embodiment includes preheating systems of Series I and Series II and a gas carrying pipe for connecting these series.

Series I is composed of the calcining kiln 5 equipped with a fuel feeding device 5a and a multi-stage suspension preheater in which solid-gas separators 11, 12, 13, 14 and 15 connected to the exhaust gas pipe 6 extending from the calcining kiln 5 and risers 11a, 12a, 13a, 14a and 15a are stacked in a multi-stage form.

Series II comprises a multi-stage suspension preheater in which solid-gas separators 21, 22, 23, 24 and 25 connected to the exhaust gas pipe 2 extending from the rotary kiln 1 and risers 21a, 22a, 23a, 24a and 25a are combinedly stacked in a multi-stage form.

Between the gas passages of Series I and Series II, there is provided a gas carrying pipe 41 for connecting the top of the calcining kiln 5 or the exhaust gas pipe 6 to the exhaust gas pipe 2. In addition to or in place of the gas carrying pipe 41, another gas carrying pipe, needless to say, may be provided between the risers 11a and 21a extending from the undermost solid-gas separators of Series I and II to connect both the series to each other.

Feed pipes 16, 26 for feeding the powdery material are fixed on gas inlet pipes 14a, 24a of the uppermost solid-gas separators 15, 25 in Series I and II, respectively. The passages for the powdery material extend downward from the separators 15, 14, 13 and 12 in Series I and from the separators 25, 24, 23 and 22 in Series II to the second solid-gas separators 12 and 22 of Series I and II. Powdery material discharging passages 12b and 22b extending from the second solid-gas separators 12, 22 from the bottoms in Series I and II run into a combining duct 12c, which is connected to the exhaust pipe 2 extending from the rotary kiln. A powdery material discharging passage 21b extending from the lowest solid-gas separator in Series II is connected to the calcining kiln 5, and a powdery material discharging passage 11b extending from the lowest solid-gas separator in Series I is connected to the rotary kiln 1.

The calcining kiln 5 on the side of Series I is provided with a fuel feeding device 5a, which serves to burn the fuel with the air of the bleed from the cooling device 3, and is separated from the rotary kiln 1. In this case, a flow calcining kiln in which a crushed coal can be used as the fuel may be utilized as the calcining kiln, and even in such conditions, an efficient calcination can be obtained.

There follows a discussion concerning the flow of gases and the powdery material in the apparatus according to this invention:

Air blown into the cooling device 3 by a pressure fan 31 which is attached to the device 3 is led into the rotary kiln 1 and the calcining kiln 5 to be utilized for combustion, a part of the air being discharged to the atmosphere by a fan 32.

The gas generated by the combustion in the calcining kiln 5 calcines the powdery material, and is led, together with a gas resulted from its calcination and the powdery material, into the solid-gas separator 11 of Series I and into and Series II separately through the exhaust gas carrying pipe 6 and the gas carrying pipe 41.

The gas discharged from the solid-gas separator 11 rises along Series I via the risers and the solid-gas separators alternatively in the order of 11a, 12, 12a, 13, 13a, 14, 14a, 15 and 15a, and is forwarded to a farther system through a duct 33 and a drawing electric fan 34.

The gas generated by the combustion of the fuel in the rotary kiln 1 is combined, in the exhaust gas pipe 2, with the exhaust gas forwarded through the gas carrying pipe 41 from the calcining kiln 5 in Series I. And the gas is then fed to the solid-gas separator 21, rises along Series II via the risers 21a, 22a, 23a, 24a and 25a and the solid-gas separators 22, 23, 24 and 25 alternatively, is combined in the duct 33 with the gas coming upward along Series I, and is discharged from the system through the drawing electric fan 34.

The powdery material is fed to tops of Series I and II through feeding pipes 16 and 26 separately, and the separated materials descend in parallel along the preheating series while carrying out heat exchange with the gases, are discharged from the second solid-gas separators 12, 22 of the series, and are combined with each other in combining duct 12. The combined material is then fed to the exhaust gas pipe 2. A portion of the powdery material is calcined and is led into the calcining kiln 5 through the solid-gas separator 21. As for the powdery material exhausted with the gas from the calcining kiln 5, a portion is recycled to the exhaust gas pipe 2 through the gas carrying pipe 41, and the remainder is separated from the gas in the solid-gas separator 11 and is led into the rotary kiln 1 through the passage 11b.

The powdery material led into the rotary kiln is calcined by a combustion device 1a fixed thereto, is cooled in the cooling derive 3, and is then discharged from the series.

Although depending on operation conditions selected, when cement is used as the powdery material in this embodiment, the temperatures of the materials discharged from the solid-gas separators 12, 22 are about 750° C., the exhaust gas from the rotary kiln has a temperature of 900° to 1200° C., the temperature of the atmosphere in the calcining kiln 5 is about 830° C. at maximum, and the temperature of the exhaust gas from the calcining kiln is 870° C. or less, and under these conditions the cement material is calcined up to approximately 100%.

The gas carrying pipe 41 permits a portion of the exhaust gas from the calcining kiln 5 to combine with the exhaust gas from the rotary kiln in order to provide Series II with supplemental heat, whereby the solid-gas heat exchange of the powdery material, which is prepared by combining powdery materials discharged from the solid-gas separators 12, 22, is accelerated in the last stage in Series II to a improve thermal efficiency and to thereby increase the efficiency of the heat exchange throughout Series II. Further, the gas carrying pipe permits the recycle of the powdery material with the gas through the channel of members 41, 2, 21, 21b and 5, whereby the residence time of the powdery material in the calcining section is extended in order to achieve sufficient heat exchange and calcination. The amount of the gas which passes through the gas carrying pipe 41 can be adjusted by setting a combustion-improving ratio to an optimum condition for maximizing the thermal efficiency in the system, taking the calcination degree of the powdery material into consideration, and an adjusting device for adjusting the transit quantity of the gas therethrough may be optionally disposed on the gas carrying pipe 41.

The mass of the powdery material to be recycled is substantially proportional to the flow capacity of the gas carrying pipe 41, and can be optionally adjusted. The exhaust gas from the calcining kiln which is accompanied by the powdery material to be recycled and which has a high partial pressure of carbon dioxide gas is diluted with the exhaust gas from the rotary kiln which has a high temperature and a low partial pressure of carbon dioxide gas, therefore the calcination of the powdery material can be efficiently finished.

Since the calcining apparatus according to this invention can increase the calcination degree of the powdery material up to about 100% by increasing the combustion-improving ratio, it is possible to miniaturize the rotary kiln 1 and to reduce a heat load. Conventionally, the sensible heat of the exhaust gas from the calcining kiln would increase and an imbalance between Series I and II would increase, but in the case of this embodiment the above imbalance can be eliminated completely by the function of the gas carrying pipe 41.

The gas carrying pipe also serves to uniformize each gas flow rate between Series I and II in the rear of the position where the gas carrying pipe is disposed and to thereby uniformize the heat exchange. Therefore, Series I and II can be built in the same shape and are interchangeable, and design, manufacture and fitting of the series are easy, which fact leads to reduction in a cost of the equipment and a maintenance cost. The drawing electric fan 34 can be jointly used for both series, therefore the gas flow rate can easily be controlled and costs of equipment and power can be saved. The above uniformization of the flow rate of the powdery material between Series I and II permits the avoidance of intricate adjustment of the flow rate of the material, whereby an operation control can easily be stabilized advantageously.

The installation of the gas carrying pipe permits the operation of either series alone. As a result, when there is a trouble at a local position, the suspension of the whole apparatus can be avoided, and at the starting of the apparatus, the heating-up all over the system can be accomplished by the only combustion device of the rotary kiln 1.

Further, even in the case that there is used a powdery material which tends to generate about a coating problem attributable to alkalis, sulfur, chlorine, etc, and/or even in the case that owing to the employment of the fuel, an alkali by-pass 51 is disposed to discharge a portion of the gas from the rotary kiln, a gas quantity and a heat exchange rate can be balanced between Series I and II.

Figure 2:
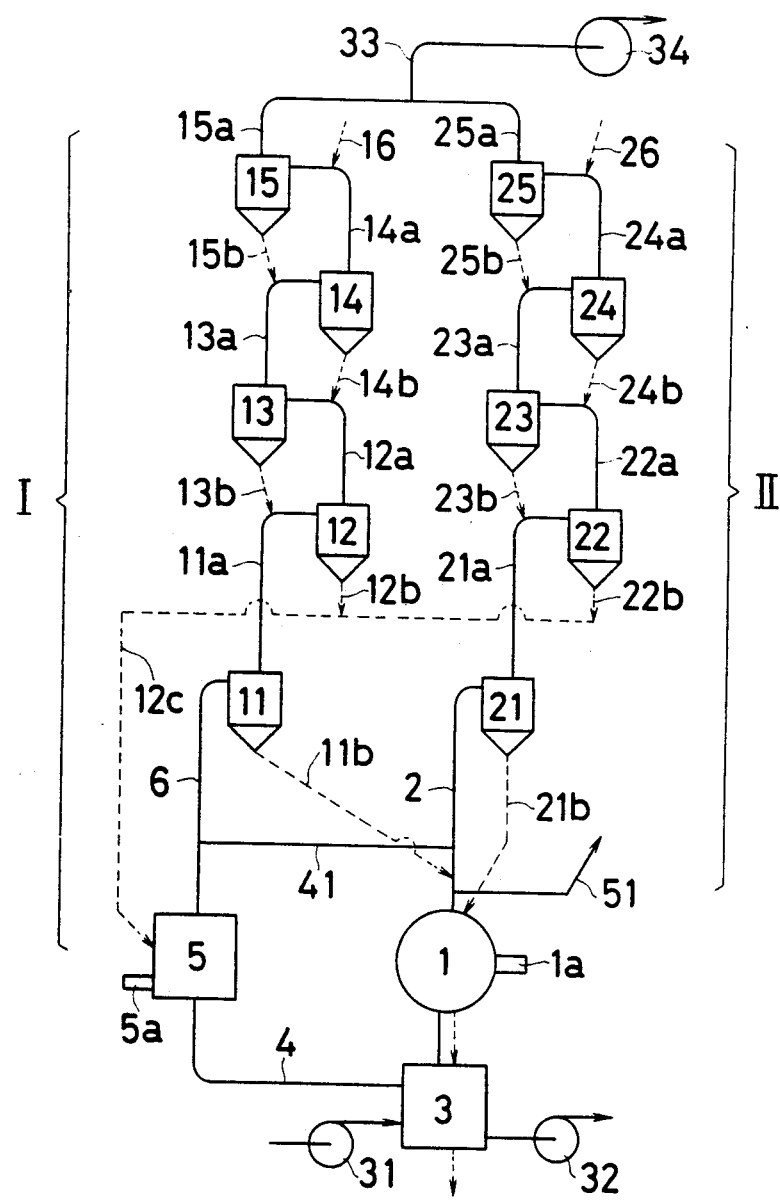

Referring now to FIG. 2 where another embodiment of the first invention is shown, a combining duct 12c for combining and carrying the powdery materials discharged from the second solid-gas separators 12, 22 from the bottoms in Series I and II is led into the calcining kiln, a powdery material carrying passage 11b extending from the lowest solid-gas separator in Series I is connected to the exhaust gas carrying duct 2 extending from the rotary kiln, and a powdery material carrying passage 21b extending from the lowest solid-gas separator in Series II is connected to the rotary kiln, and all the elements shown FIG. 2, except the above arrangements, are the same as in the embodiment shown in FIG. 1.

According to the embodiment exhibited in FIG. 2, the calcination of the powdery material can be substantially completed by calcinating finally the powdery material, the calcination of which has already been almost completed in the calcining kiln 5, with the aid of the exhaust gas from the rotary kiln which has a high temperature and a low partial pressure of carbon dioxide gas. The gas carrying pipe 41 allows the exhaust gas from the calcining kiln to flow therethrough, whereby the heat of the exhaust gas from the rotary kiln can be supplemented, the space where the solid and the gas are subjected to the heat exchange treatment can be expanded, and gas flow and retained heat are balanced between Series I and II. Except that a portion of the powdery material is recycled, this embodiment shown in FIG. 2 has the same functional effects as in the embodiment shown in FIG. 1.

Figure 3:
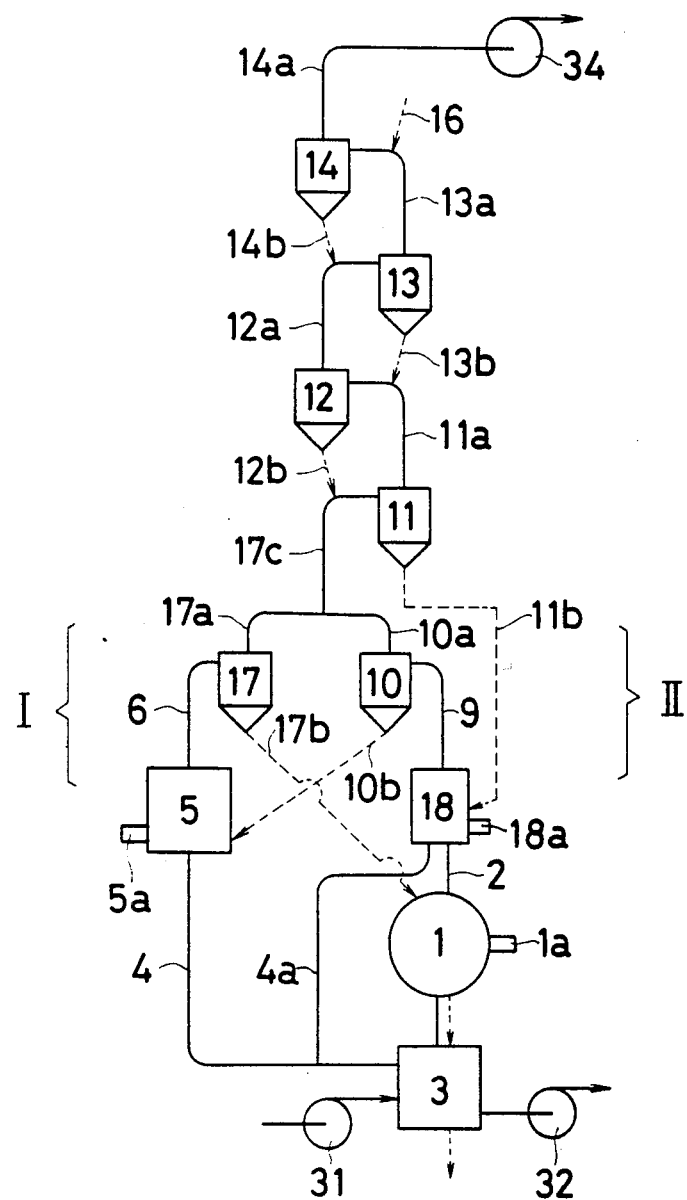
FIGS. 3 and 4 are flow sheets showing embodiments of a second invention of this disclosure.

Referring now to FIG. 3 in which an embodiment of the second invention with regard to this application is exhibited, reference numeral 1 is a rotary kiln, numeral 1a is a feeding device for feeding a fuel to the rotary kiln, 2 is an exhaust gas pipe extending from the rotary kiln, 3 is a cooling device for cooling a calcined material, 4 and 4a are bleeding pipes, 5 is a calcining kiln, 5a, is a feeding device for feeding a fuel to the calcining kiln, 6 is a gas pipe extending from the calcining kiln and 17 is a solid-gas separator, and the gas pipe 6 and the solid-gas separator constitute a first preheater. Reference numeral 18 is a sub-calcining kiln, numeral 18a is a feeding device for feeding a fuel to the sub-calcining kiln, 9 is an exhaust gas carrying pipe extending from the sub-calcining kiln and 10 is a solid-gas separator, and the exhaust gas carrying pipe 9 and the solid-gas separator 10 constitute a second preheater. Reference numerals 11, 12, 13 and 14 are solid-gas separators, numerals 11a, 12a, 13a and 14a are risers for them, and the separators and risers constitute a group of preheaters which are stacked in a plural-stage form. Gas carrying pipes 17a and 10a extending from the first and second preheaters combinedly run into a pipe 17c, which is connected to the undermost solid-gas separator 11 of the group of preheaters.

Reference numeral 31 is a pressure fan fixed to the cooling device, numeral 32 is a drawing fan connected to the cooling device, and 34 is a drawing electric fan.

In the drawing, dotted lines represent passages of the powdery material. Reference numeral 16 is a feeding pipe for feeding the powdery material, numerals 14b, 13b and 12b denote powdery material carrying pipes extending from the solid-gas separators 14, 13 and 12, respectively, and the powder material will descend along the group of preheaters therethrough.

Reference numeral 11b is a powdery material carrying pipe extending from the undermost solid-gas separator of the preheater group to the sub-calcining kiln 18. Numeral 10b is a powdery material carrying pipe extending from the second preheater to the calcining kiln 5. Numeral 17b is a powdery material carrying pipe extending from the first preheater, in which the gas from the calcining kiln and the powdery material are allowed to carry out a heat exchange, to the rotary kiln. In the case of this embodiment, all the powdery material will pass through the sub-calcining kiln, the second preheater, the calcining kiln and the first preheater.

The calcining kiln 5 above is equipped with the fuel feeding device 5a, serves to burn the fuel with the aid of the bleed from the cooling device 3, and is separated from the rotary kiln 1. It is suitable to employ, as the calcining kiln, a flow calcining kiln in which crushed coal can be used effectively and stably as a fuel in order to carry out the calcination of the powdery material. Thus, even with the employment of such crushed coal, the calcining apparatus of this invention can be operated in a good efficiency.

The sub-calcining kiln 18 is a cylindrical calcining kiln secured to the exhaust gas carrying pipe extending from the rotary kiln, is equipped with the fuel feeding device 18a, and serves to burn the fuel by mixing the bleed from the cooling device 3 with the exhaust gas from the rotary kiln. Since the exhaust gas from the rotary kiln has a relatively high temperature but is small in a retained heat because the gas volume is low, a very small portion of the powdery material is calcined. In this embodiment, the powdery material discharged from the solid-gas separator 11 of the preheater group is all fed to the sub-calcining kiln 18 to undergo a heat exchange therein. The sub-calcining kiln 18 supplements the heat of the exhaust gas from the rotary kiln, and extends its residence time in order to accelerate the solid-gas heat exchange and to thereby calcinate the powdery material, whereby the efficiency of the calcination can be heightened so that the powdery material may be calcined completely in the main calcining kiln.

The series comprising the sub-calcining kiln 18 and the second preheater, and the other series comprising the calcining kiln 5 and the first preheater can be suitably controlled for the uniformization of heat by adjusting the combustion of the fuel in the sub-calcining kiln 18 to procure the most ideal distribution of heat load, whereby the calcination degree of the powdery material can be increased up to approximately 100%, and the apparatus of this embodiment can be operated in a maximum thermal efficiency.

Since the apparatus of this embodiment can obtain the calcination degree of about 100% by increasing the combustion-improving ratio, it is possible to miniaturize the rotary kiln 1 and to reduce the heat load. Further, since the feeding of the fuel to the main calcining kiln 5 can be decreased when the fuel is being fed to the sub-calcining kiln 18, the sensible heat carried by the exhaust gas from the main calcining kiln 5 will be minimized with the result that the thermal efficiency will be dropped. Furthermore, a proportion of the heat exchange to be alloted to the main calcining kiln 5 and the sub-calcining kiln 18 can be suitably controlled, and the consumption of the fuel can be reduced.

The main calcining kiln 5 is designed so that the residence time of the gas may be extended due to the reduction in the gas volume and the accepted powdery material which has already undergone the partial calcination may accomplish an enough solid-gas heat exchange, therefore even in the case of a coal which is slow in combustion rate is used, the finishing of the calcination can be carried out in a good efficiency, and the increase in the sensible heat carried by the exhaust gas from the main calcining kiln can be inhibited.

The sub-calcining kiln 18 can produce a reducing atmosphere by selecting the position where the bleeding pipe 4a extending from the cooling device 3 communicates with the kiln 18, so that nitrogen oxides generated in the rotary kiln 1 can be chemically reduced, and the exhaustion quantity of the oxides can be lessened, which can contribute to the prevention of air pollution.

Figure 4:
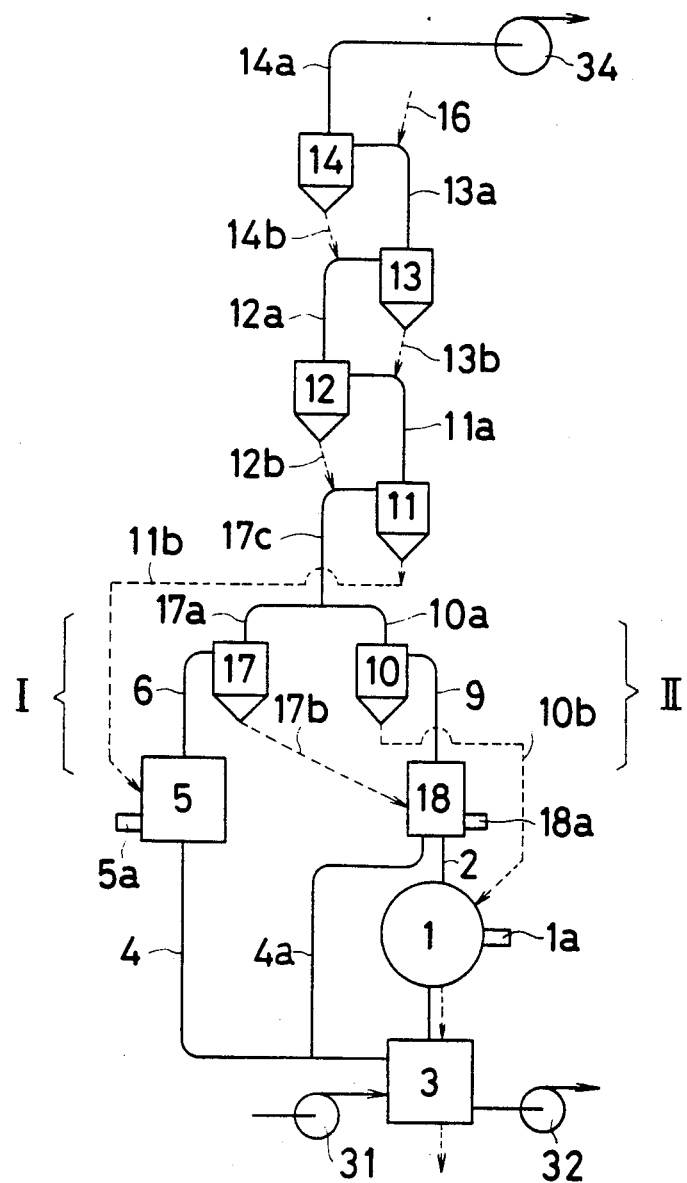

Referring now to FIG. 4 in which another embodiment of the second invention with regard to this application is shown, the flow path for the powdery material is adapted so that the material discharged from the group of preheaters may pass through, first, the main calcining kiln 5, then the first preheater, sub-calcining kiln 18 and the second preheater in turn, and reach the rotary kiln 1. In this embodiment, the powdery material is first calcined in the main calcining kiln 5 and is then the calcination is completed in the sub-calcining kiln 18, whereby the calcination degree of the powdery material can be raised to approximately 100%, and functional effects regarding the consumption of the fuel and the controllability of the operation are the same as in the embodiment shown in FIG. 3.

Figure 5:
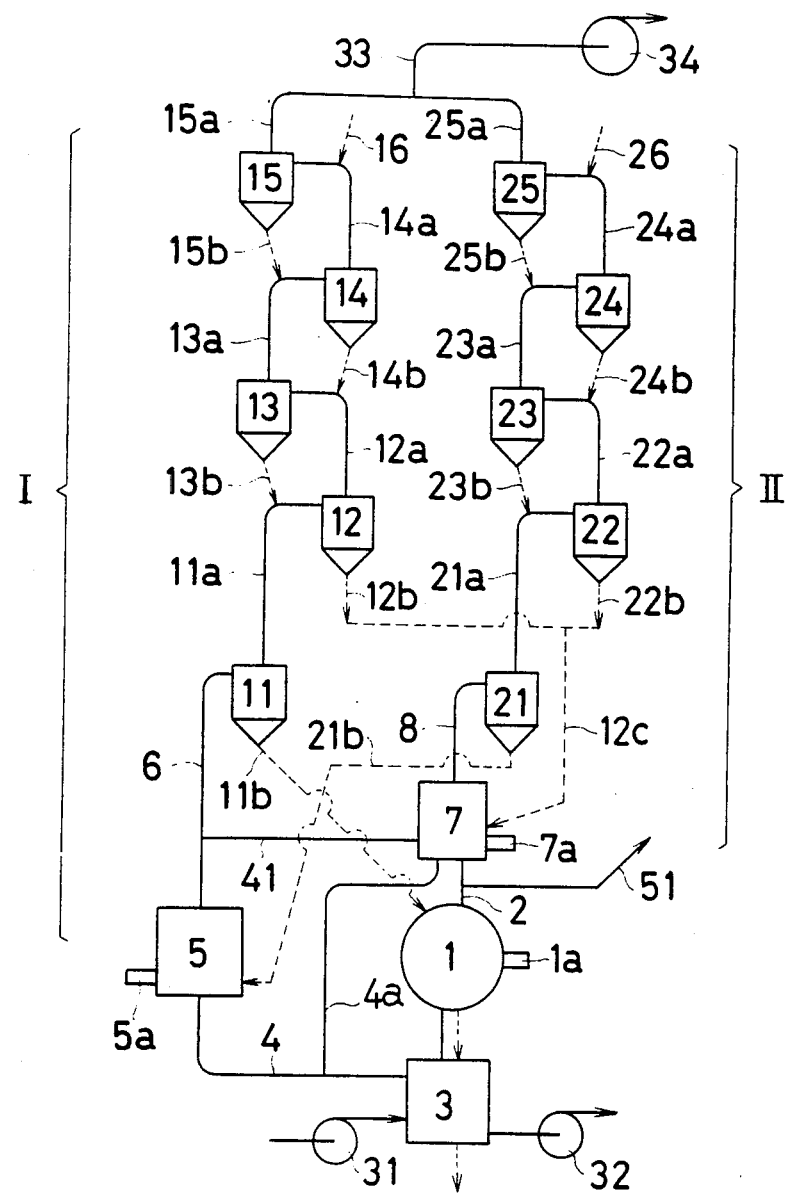
FIGS. 5 and 6 are flow sheets showing embodiments of a third invention of this disclosure.

FIG. 5 shows an embodiment of the third invention of this application, which is the same as the embodiment of the above-mentioned first invention shown in FIG. 1 with the exception that a sub-calcining kiln 7 equipped with a feed device 7a for feeding a fuel thereto is interposed between the rotary kiln 1 and the solid-gas separator 21, and the gas carrying pipe 41, a bleeding pipe 4a extending from the cooling device and the combining pipe 12c for combining the powdery materials are connected to the sub-calcining kiln 7, which is further connected to the solid-gas separator 21 via an exhaust gas carrying pipe 8. Elements and reference numerals for members other than the above are the same as in the embodiment shown in FIG. 1, hence more detailed description will be omitted.

The gas generated by the combustion in the main calcining kiln 5 calcines the powdery material, and is led, together with the gas resulting from its calcination and the powdery material, into the solid-gas separator 11 and the sub-calcining kiln 7 or the exhaust gas carrying pipe extending from the sub-calcining kiln, through the exhaust gas carrying pipe 6 and the gas carrying pipe 41.

The gas discharged from the solid-gas separator 11 rises along Series I via the risers and the solid-gas separators 11a, 12, 12a, 13, 13a, 14, 14a, 15 and 15a, and is forwarded to a farther system through a duct 33 and a drawing electric fan 34.

The gas generated by the combustion of the fuel in the rotary kiln 1 is led into the sub-calcining kiln 7 and burns the fuel fed through a feeding device 7a with the aid of the bleed from the cooling device 3 to heat and calcine the powdery material fed to the sub-calcining kiln. And this gas is further combined with the gas coming from the main calcining kiln 5 in Series I through the gas carrying pipe 41, is led into the solid-gas separator 21 via the exhaust gas carrying pipe 8, rises along Series II via the risers and the solid-gas separators 21a, 22, 22a, 23, 23a, 24, 24a, 25 and 25a, is combined with the gas from Series I in the duct 33, and is discharged from the system through the drawing electric fan 34.

The powdery material is fed at the top of Series I and II through feeding pipes 16 and 26 separately in about equal volumes, and the separated materials descend in parallel through each series while carrying out the heat exchange with the gases therein, are discharged from the second solid-gas separators 12, 22 from the bottoms of the series, and are combined with each other, and the combined material is then fed to the sub-calcining kiln 7 to be partially calcined. Next, the powdery material is combined with the other powder material coming with the gas from the main calcining kiln in Series I through the gas carrying pipe 41, and is led into the main calcining kiln 5 in Series I through the solid-gas separator 21 while making progress in the calcination.

Figure 6:
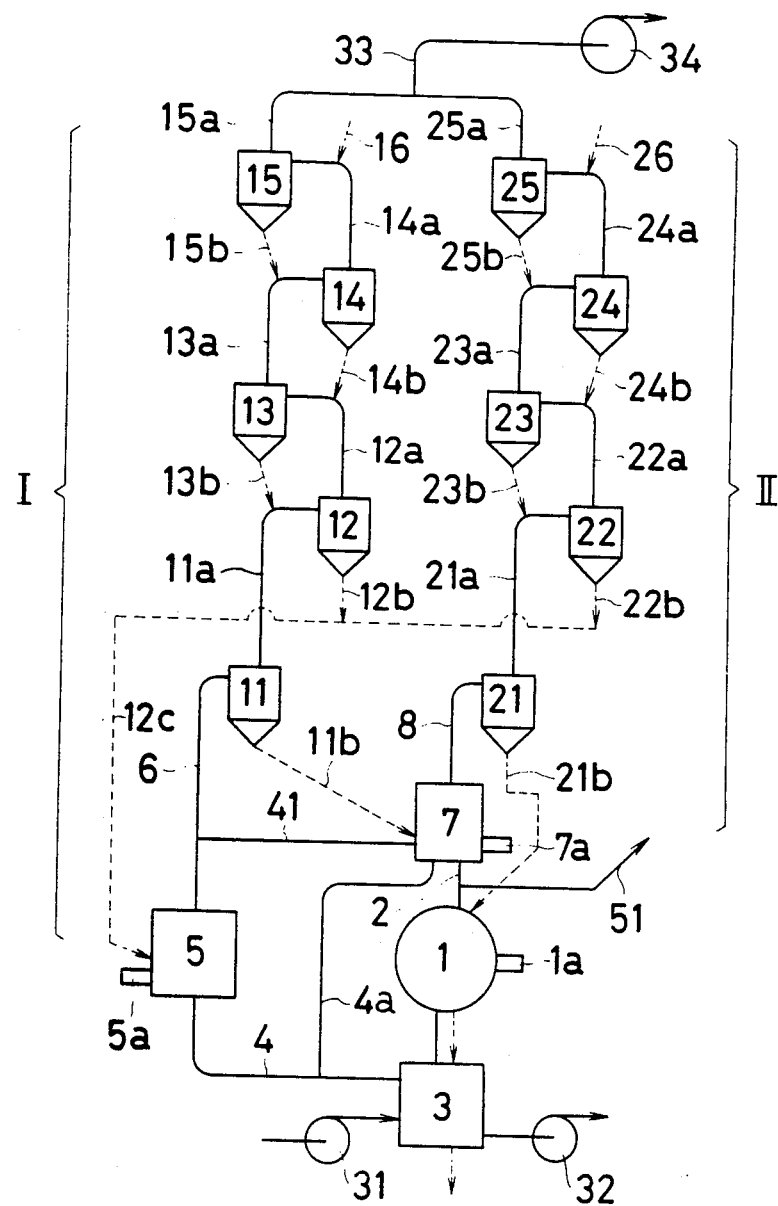

FIG. 6 shows another embodiment of the third invention, which is the same as the embodiment shown in FIG. 5 with the exception that a traveling channel for allowing the powdery material to be calcined therein is different, and it corresponds to the embodiment shown in FIG. 2. In the embodiment shown in FIG. 6, the powdery material is led into the rotary kiln 1 via a combining duct 12c disposed in front of the undermost solid-gas separators of Series I and II, the main calcining kiln 5, the solid-gas separator 11 in Series I, the sub-calcining kiln 7 and the solid-gas separator 21 in Series II.

In this case, the calcination of the powdery material is first carried out in the main calcining kiln 5 and the finishing calcination is carried out in the sub-calcining kiln 7.

The calcination of the powdery material, the consumption of the fuel and the ease of the operation in this embodiment are not appreciably different from the embodiment shown in FIG. 5.

Figure 7:
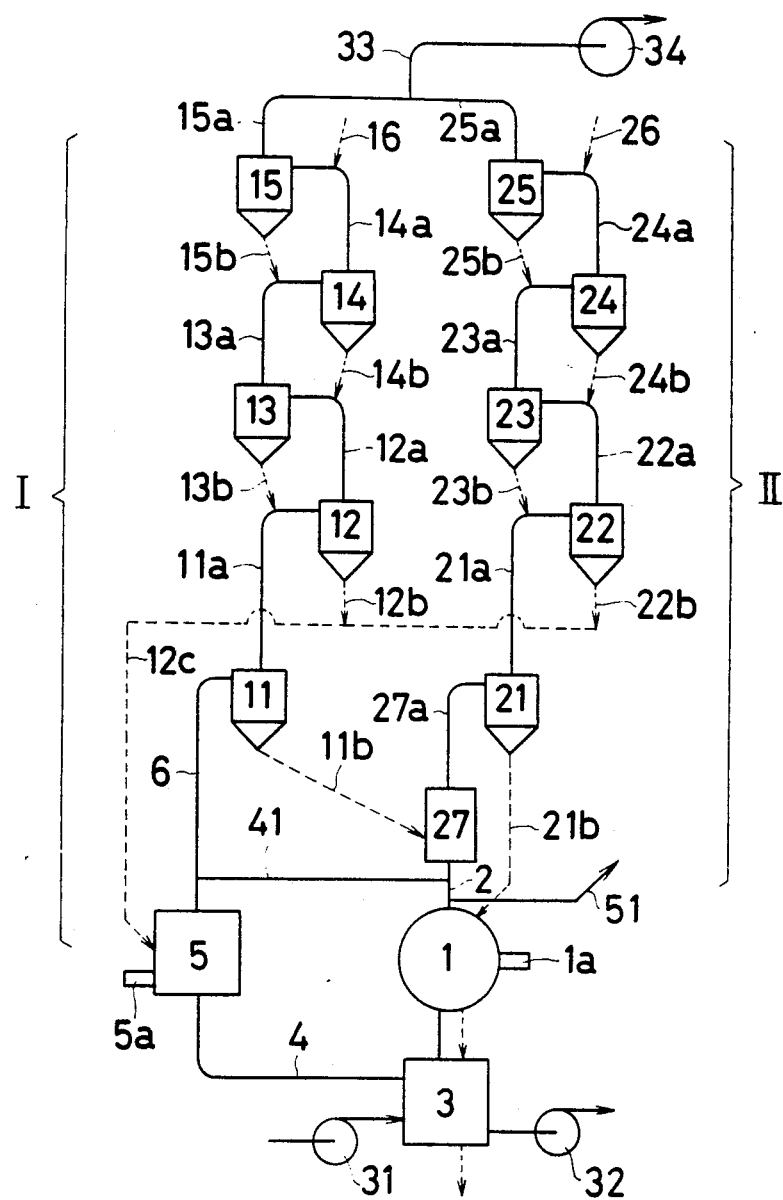
FIGS. 7 and 8 are flow sheets showing embodiments of a fourth invention with regard to this application.

FIG. 7 shows an embodiment of the fourth invention of this application, which is the same as the embodiment of the first invention shown in FIG. 2 with the exception that a calcining chamber 27 is disposed between the rotary kiln 1 and the solid-gas separator 21 and is connected to the solid-gas separator 21 with the interposition of the riser 27a, and a powdery material carrying passage 11b is connected to the calcining chamber 27.

The calcining chamber 27 is an upright cylinder disposed in the middle of the exhaust pipe 2 extending from the rotary kiln 1, and has no fuel feeding device. Moreover, the calcining chamber 27 permits an increase in the residence time of the powdery material in order to carry out sufficient heat exchange between the powdery material and the exhaust gas from the rotary kiln, and serves to heat the material, to finish the calcination and to drop the temperature of the exhaust gas from the rotary kiln. Further, the calcining chamber 27 can have a sufficiently large sectional area so that it will not be closed or clogged.

The calcining chamber 27 is constituted as follows: The calcining chamber is an upright cylinder which allows the exhaust gas from the rotary kiln to be led from below, and has the same inlet sectional area as that of the exhaust gas carrying pipe 2 extending from the rotary kiln. In this way, the gas rate of the exhaust gas from the rotary kiln is maintained at a sufficiently great level to prevent the powdery material fed to the calcining chamber from dropping along the pipe 2 and short passing to the rotary kiln. Further, the gas outlet sectional area of the calcining chamber, i.e. the sectional area of a riser 27a extending from the calcining chamber is narrowed down to provide a gas rate of ensuring that the powdery material is discharged from the calcining chamber with the gas and a collection efficiency of the solid-gas separator 21 is kept up. The calcining chamber which comprises an upright cylinder having the narrowed gas inlet and outlet, as mentioned above, functions to achieve a complete finishing calcination and to extend the residence time with the aim of achieving a sufficient drop of the gas temperature.

Accordingly, the apparatus of this embodiment has a higher calcination degree of the powdery material and a more excellent thermal efficiency, as compared with a conventional calcining device. Further, since the sectional area of the calcining chamber is large, the coating trouble which will be described below can be eliminated.

Incidentally, the gas carrying pipe 41 allows a portion of the exhaust gas from the calcining kiln to flow toward the calcining chamber 27, so that the powdery material in the calcining chamber 27 is calcined completely with the aid of the flowing gas.

Figure 8:
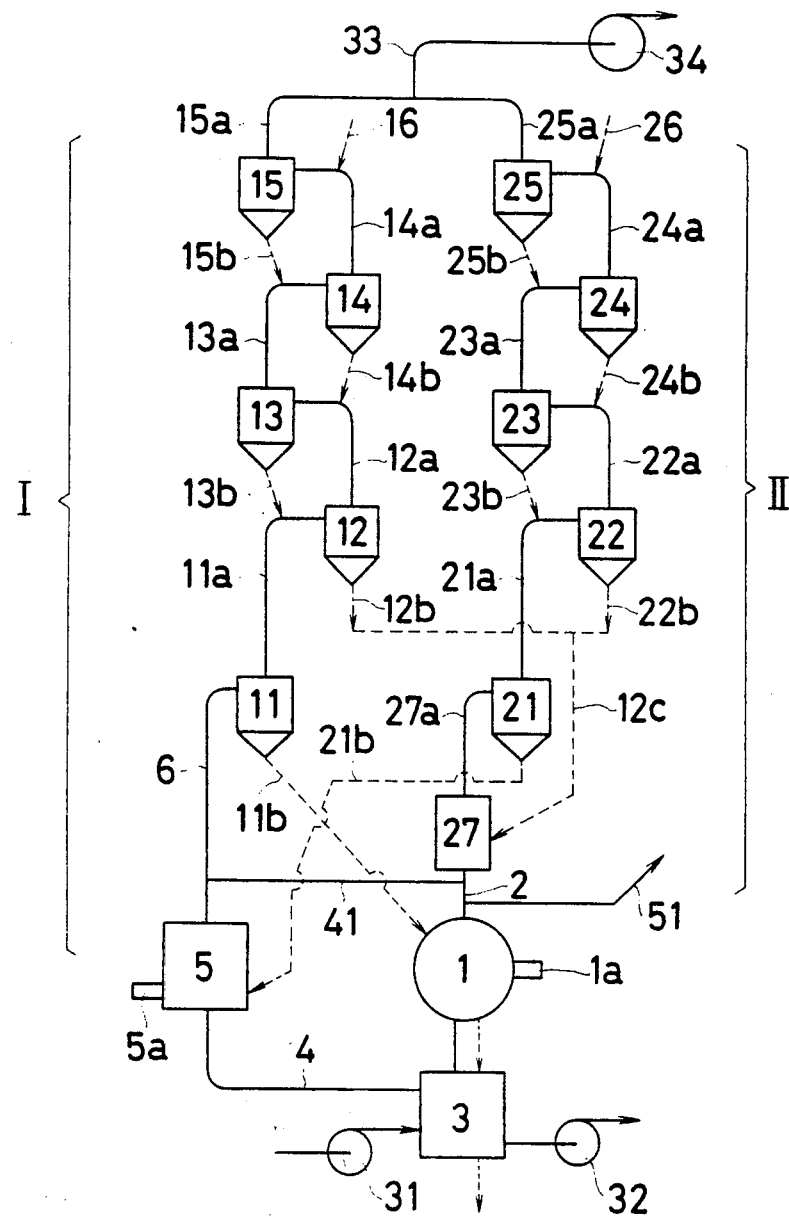

Referring now to FIG. 8 in which another embodiment of the fourth invention is shown, a combining duct 12c for combining the powdery materials separated in the solid-gas separators 12, 22 is connected to the calcining chamber 27, and the traveling channel for the powdery material is altered so that the material the fed from the calcining chamber 27 to the rotary kiln 1 via the solid-gas separator 11. This embodiment corresponds to the embodiment of the first invention shown in FIG. 1.

The embodiment shown in FIG. 8 h as the same functional effects as in the embodiment shown in FIG. 7, and additionally, since a portion of the powdery material travels through the calcining kiln 5, the gas carrying pipe 41, the calcining chamber 27, the riser 27a and the solid-gas separator 21, the residence time, in the calcining section, of the powdery material can be further extended so as to accomplish completely the calcination of the powdery material.

Incidentally, the gas duct 51 in FIGS. 7 and 8 is a known by-pass duct, and when the material and/or the fuel contains easily volatile and condensable substances such as compounds of alkalis, sulfur or chlorine and a coating trouble occurs due to them in the calcining chamber 27, the above-mentioned gas duct 51 serves to discharge such compounds with a portion of the exhaust gas from the rotary kiln out of the system.

According to this embodiment, when the above compounds (hereinafter referred to as condensable components) are removed from the system to avoid the coating trouble, and when a portion of the exhaust gas from the rotary kiln is discharged from the system through the by-pass duct 51 and an imbalance occurs between Series I and II, the gas carrying pipe 41 and/or 42 permits the gas quantity in both the series to be equalized.

Procedures, other than mentioned above, of avoiding the coating trouble caused by the condensable components will be described in the following, with regard to FIGS. 7 and 8.

As is known, the condensable components are taken in the system by the powdery material and/or the fuel and is forwarded to the rotary kiln, and a portion of the components is fixed to the calcined material and discharged from the system. However, the amount of the components which is discharged in such a manner is limited, and when the amount of the components taken in the system is in excess of a certain level, they will accumulate in the system. In other words, the condensable components volatilize in the rotary kiln, and they are forwarded to the calcining device with the exhaust gas from the rotary kiln and condense there. A portion of the components is fixed to the powdery material, and forwarded to the rotary kiln again and volatilize there. In this way, the recycle is established. Simultaneously, the rest of the components adhere, in the form of a coating rich in condensable components, to inner surfaces of the calcining apparatus, for example, inner walls of the exhaust gas carrying pipe 2 extending from the rotary kiln, the calcining chamber 27, the riser 27a, the solid-gas separator 21 and the riser 21a. The coating will grow with time, because a temperature of the gas in these members is within the range of a temperature at which the condensable components condense.

The calcining chamber of this invention is designed so that its sectional area may maintain sufficiently effective hollow space even when the coating is accumulated on the inner wall of the chamber, therefore pressure loss time of the running gas being varies very little and the calcination of the powdery material in the chamber is not affected at all.

Accordingly, since the condensable components in the system condense and deposit on the inner wall of the calcining chamber in the form of the coating, a worker or operator can remove the deposited coating from the system by cleaning the chamber when out of operation of the apparatus. Further, in the case that the powdery material and/or the fuel takes a great deal of condensable components in the system, the work of removing the coating from the calcining chamber can be carried out efficiently when in operation of the apparatus, since the calcining chamber is adapted to have a large sectional area.

In the case that these processes are still insufficient, this invention can follow the procedure of discharging a portion of the exhaust gas leaving the rotary kiln from the system through the by-pass duct 51, as mentioned above.

According to the calcining apparatus of this invention as described above, the following effects can be obtained:

(1) The powdery material can be calcined up to nearly 100% before being fed to the rotary kiln.

(2) The gas flow rate and the gas sensible heat in Series I and II are equalized to each other, whereby the streams of the powdery materials can pass through Series I and II in equal volumes.

Further, the devices of Series I and II can be manufactured in the same shape, one drawing electric fan is enough for operation, and facility investment, maintenance cost and operating cost can be minimized.

(3) This calcining apparatus can be operated with only one preheater series, therefore the operation can be continued even during local repair or trouble, without suspending the whole facilities. Further, heatingup can be easily accomplished.

(4) Even when the exhaust gas from the rotary kiln is discharged from the system through the disposed by-pass duct to prevent coating trouble in the case that alkalis, sulfur, chlorine and the like are included at high concentration in the powdery material and/or the fuel, a balanced operation is possible.

(5) The residence time of the powdery material in the calcining section is extended by sharing the calcination between the main calcining kiln and the sub-calcining kiln and by expanding thus the calcining section having a temperature suitable for the calcination, whereby the ideal heat exchange in the calcining section can be achieved, the calcination degree of the powdery material can be improved to nearly 100%, and the sensible heat carried by the exhaust gas can be minimized, which permits saving the consumption of the fuel.

(6) The sub-calcining kiln can denitrate $NO_x$ in the exhaust gas from the rotary kiln and can contribute to the prevention of environmental pollution.

(7) The coating resulting from the condensation of condensable components in the preheater is controlled so as to occur in the calcining chamber having a large sectional area, whereby the pressure loss caused by the formed coating can be greatly reduced compared to the conventional calcining apparatus, and the work of removing the coating can be facilitated.

What is claimed:

1. A calcining apparatus for powdery material, which comprises
  A. a first preheating series consisting of a calcining kiln and a calcining kiln exhaust pipe connecting said calcining kiln to a first plurality of preheaters for preheating powdery material with exhaust gas from said calcining kiln said first plurality of preheaters including a lowermost first series preheater in direct operative relationship with said calcining kiln and a second preheater in direct operative relationship with said lowermost preheater in said first preheating series,
  B. a second preheating series consisting of a rotary kiln and a rotary kiln exhaust pipe connecting said rotary kiln to a second plurality of preheaters for preheating powdery material with exhaust gas from said rotary kiln, said second series of preheaters including a lowermost second series preheater in direct operative relationship with said rotary kiln and a second preheater in direct operative relationship with said first lowermost preheater in said second preheating series,
  C. means for permitting separate portions of material to be calcined into each of said preheating preheater series at the preheater in each series most remote from the kilns of each series,
  D. a converging conduit pipe for collecting and combining the portions of material from the second preheater of each of said preheater series,
  E. means for circulating said combined portions through a powdery material circulating circuit comprising said calcining kiln and each of said lowermost preheaters and into said rotary kiln, and
  F. a connecting gas pipe connecting said calcining kiln exhaust pipe and said rotary kiln exhaust pipe.

2. An apparatus as in claim 1 wherein said powdery material circulating circuit includes as elements the lowermost second series preheater, the calcining kiln and the lowermost first series preheater through which powdery material circulates successively before entering the rotary kiln.

3. An apparatus as in claim 1 wherein said powdery material circulating circuit powdery material circulating circuit includes the calcining kiln, the lowermost first series preheater and the lowermost second series preheater through which the powdery material circulates successively before entering the rotary kiln.

4. An apparatus as in claim 1 including a sub-calcining kiln mounted on the rotary kiln exhaust pipe between the rotary kiln and the lowermost second series preheater; and the powdery material circulating circuit includes the sub-calcining kiln, the lowermost second series preheater, the calcining kiln, and the lowermost first series preheater through which the powdery material circulates successively before entering the rotary kiln.

5. An apparatus as in claim 1 including a sub-calcining kiln mounted on the rotary kiln exhaust pipe between the rotary kiln and the lowermost second series preheater; and the powdery material circulating circuit includes the calcining kiln, the lowermost first series preheater, the sub-calcining kiln, and the lowermost second series preheater through which the powdery material circulates before entering the rotary kiln.

6. An apparatus as in claim 1 including a calcining chamber mounted on the rotary kiln exhaust pipe between the rotary kiln and the lowermost second series preheater; and the powdery material circulating circuit includes the calcining kiln, the lowermost first series preheater, the calcining chamber, and the lowermost second series preheater through which the powdery material circulates before entering the rotary kiln.

7. An apparatus as in claim 1 including a calcining chamber mounted on the rotary kiln exhaust pipe between the rotary kiln and the lowermost second series preheater; and the powdery material cirulating circuit includes the calcining chamber, the lowermost second series preheater, the calcining kiln and the lowermost first series preheater through which the powdery material circulates before entering the rotary kiln.

* * * * *